United States Patent [19]

Brilliande

[11] Patent Number: 4,813,177
[45] Date of Patent: Mar. 21, 1989

[54] HORTICULTURAL CONTAINER

[76] Inventor: Gary S. Brilliande, 606 Ulumu St., Kailua, Hi. 96734

[21] Appl. No.: 128,941

[22] Filed: Dec. 4, 1987

[51] Int. Cl.⁴ ............................................. A01G 9/02
[52] U.S. Cl. ........................................................ 47/66
[58] Field of Search ............................................ 47/66

[56] References Cited

U.S. PATENT DOCUMENTS

| | | |
|---|---|---|
| 19,406 | 11/1889 | Whilldin . |
| 20,133 | 11/1890 | Whilldin . |
| 243,031 | 1/1977 | Anderson ................................. 47/66 |
| 758,678 | 5/1904 | Muller . |
| 1,453,216 | 4/1923 | Weidig . |
| 1,775,831 | 9/1930 | Salisbury ................................. 47/66 |
| 1,932,748 | 10/1933 | Peck ........................................ 47/38 |
| 2,404,370 | 7/1946 | Fowlkes ................................... 47/66 |
| 3,987,584 | 10/1976 | Yellin ....................................... 47/66 |
| 4,062,147 | 12/1977 | Phillips .................................... 47/71 |
| 4,077,159 | 3/1978 | Haglund ................................... 47/66 |
| 4,173,097 | 11/1979 | Staby ....................................... 47/66 |
| 4,301,663 | 6/1977 | Brunk ...................................... 47/66 |

FOREIGN PATENT DOCUMENTS

| | | | |
|---|---|---|---|
| 7970 | of 1884 | United Kingdom ..................... 47/66 |
| 300 | of 1912 | United Kingdom ..................... 47/66 |
| 1069101 | 5/1967 | United Kingdom ..................... 47/66 |
| 1586781 | 3/1981 | United Kingdom ..................... 47/66 |

Primary Examiner—Deborah L. Kyle
Assistant Examiner—Richard W. Wendtland
Attorney, Agent, or Firm—Jordan M. Meschkow; Don J. Flickinger

[57] ABSTRACT

The bottom of a flower pot includes a pair of top surfaces which extend downwardly outward from a medial apex to the inner surface of an upright continuous sidewall having an upper edge defining an open top. A terminal portion of one of the top surfaces extends over an aeration opening residing at the apex. A drainage opening extends through the bottom near the juncture of each top surface and the sidewall. Additional openings through the sidewall are located below the bottom.

17 Claims, 2 Drawing Sheets

HORTICULTURAL CONTAINER

BACKGROUND OF THE INVENTION

1. Field of the Invention

This invention relates to horticultural containers.

More particularly, the present invention relates to containers of the type for holding potting medium in which is supported the root structure of a plant.

In a further and more specific aspect, the instant invention concerns a horticultural container having improved means for draining and aeration.

2. The Prior Art

The prior art is replete with various horticultural containers for holding potting medium in which is held the root structure of a plant. Commonly referred to as flower pots, the devices generally include a continuous upstanding sidewall having an open top and a closed bottom. When viewed in plan, the device may appear as a standard geometric form, such as a circle or rectangle, or as a free form incorporating artistic flair. Similarly, simple familiar shapes or sculptured contours may be presented in elevation.

Periodically, water or other liquid which may contain nutrients is introduced into the potting material through the open top of the container. It is well known that excess water is deleterious to the plant. Therefore, provision for drainage must be provided in the container. It is also recognized that aeration of the root structure is required for maximum health of the plant.

The conventional flower pot, as will be immediately perceived by those having regard for the instant subject; comprises an inverted frusto-conical sidewall and a planar bottom having a single central opening. Ceramics and plastics are common materials of fabrication. The central opening provides the dual function of aeration and drainage. It is standard practice to place the pot upon a second vessel usually a shallow dish, to catch water which drains from the opening.

The foregoing arrangement has certain shortcomings. Most notably is the relatively large opening through which the potting material may pass. Accordingly, it is typical, make-shift procedure to place a stone or other object over the opening to retain the potting medium. However, since the bottom resides at the nethermost portion of the sidewall and within the secondary vessel, drainage of the potting medium is never completed. Further, aeration of the root system, even when no water exists in the secondary vessel, is practically non-existent.

In partial recognition of the problem, the prior art has suggested various proported solutions. An often advanced proposal is the elevating of the bottom of the container from the supporting surface. Primarily this is accomplished either by providing the flower pot with legs or placing the bottom at a location spaced from the lower edge of the sidewall. Also suggested is the incorporation of multiple openings, some of which may penetrate the sidewall.

While smaller openings may be beneficial in the retention of potting medium, neither drainage nor aeration is materially improved. Excess water can accumulate and remain in areas remote from an opening, especially if the container rests atilt. Drainage from openings in the sidewall will leave unsightly chemical deposits upon the container. In either case, aeration is not promoted.

It would be highly advantageous, therefore, to remedy the foregoing and other deficiencies inherent in the prior art.

Accordingly, it is an object of the present invention to provide improvements in horticultural containers.

Another object of the invention is the provision of an improved horticultural container of the type commonly referred to as a flower pot and especially adapted to hold potting medium in which is supported the root structure of a plant.

And another object of this invention is to provide a flower pot having ameliorated drainage means.

Still another object of the invention is the provision of means for positive drainage of the potting medium held in a horticulture container.

Yet another object of the immediate invention is to provide improved means for aeration of the potting medium held in a flower pot.

Yet still another object of the invention is the provision of a horticultural container having a novel bottom especially devised to promote plant health and care.

A further object of the invention is to provide a flower pot which will avoid the need for crocking, such as chalk, charcoal or other additions usually required to prevent souring of the potting medium.

And a further object of the instant invention is the provision of a flower pot having improvements for the substantial elimination of residual contaminate build-up.

Still a further object of the invention is to provide an improved flower pot that is readily usable with conventional secondary vessels normally used for catching and retaining drainage.

And a still further object of the invention is the provision of a horticultural container according to the foregoing which is relatively simple and inexpensive to manufacture.

SUMMARY OF THE INVENTION

Briefly, to achieve the desired objects of the instant invention in accordance with a preferred embodiment thereof, first provided is a continuous upstanding sidewall including an upper edge defining an open top, a lower edge and an interior sidewall. Next provided is a bottom including a first top surface and a second top surface which extend downwardly outward from a substantial apex in opposite directions to the interior surface of the sidewall. A drainage opening extends through the bottom proximate the juncture of each top surface and the interior surface. An aeration opening resides proximate the apex.

In accordance with a further embodiment of the invention, the device further includes a hood extending over the aeration opening to prevent free passage of the potting medium therethrough. Further, the top surfaces are carried by respective panels and the aeration opening is defined between the free edges of the panels. Preferably, the hood comprises a terminal portion of one of the panel members which extends over and is spaced above the free edge of the other panel member.

BRIEF DESCRIPTION OF THE DRAWINGS

The foregoing and further and more specific objects and advantageous of the instant invention will become readily apparent to those skilled in the art from the following detailed description of preferred embodiments thereof taken in conjunction with the drawings in which.

DETAILED DESCRIPTION OF THE PREFERRED EMBODIMENTS

Figure 1:
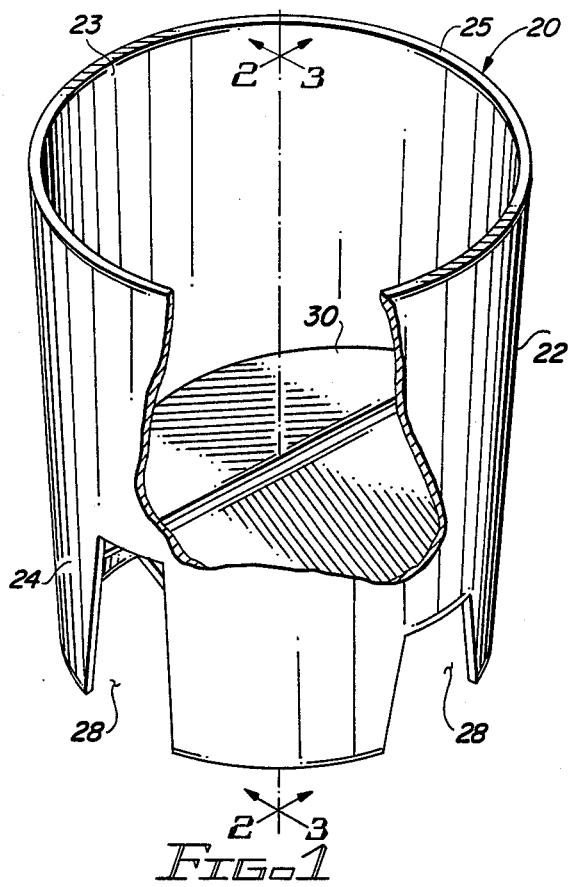
FIG. 1 is a perspective view of a horticultural container constructed in accordance with the teachings of the instant invention, portions thereof being broken away for purposes of illustrations.

Turning now to the drawings in which like reference characters indicate corresponding elements throughout the several views, attention is first directed to FIG. 1 which illustrates a horticultural container, generally designated by the reference character 20, including continuous upright sidewall 22 having interior surface 23, exterior surface 24, upper edge 25 and lower edge 27. A plurality of openings 28, defined by respective cut-out portions extending upwardly from lower edge 27, extend through sidewall 22. It is noted that upper edge 25 defines an open top for the container 20.

Figure 2:
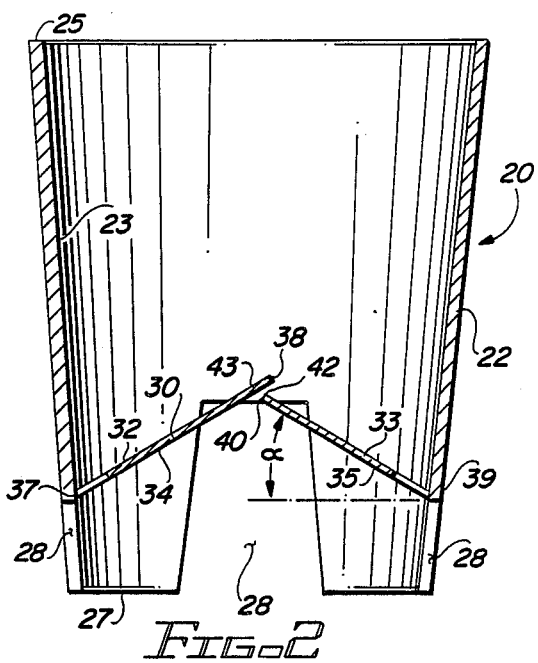
FIG. 2 is a vertical sectional view taken along the line 2—2 of FIG. 1.
Figure 3:
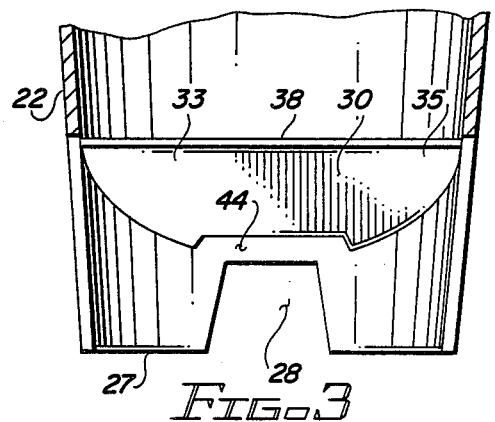
FIG. 3 is a fragmentary vertical sectional view taken along the line 3—3 of FIG. 1.

As seen in greater detail in FIGS. 2 and 3, container 20 further includes a bottom 30 having first and second inclined top surfaces 32 and 33, respectively. In accordance with the immediately preferred embodiment of the instant invention, first top surface 32 is carried by first panel 34 while second top surface 33 is carried by second panel 35. First panel 34 includes fixed edge 37 which is secured to the inner surface 23 of sidewall 22 and an upwardly inwardly directed free edge 38. Similarly, second panel 35 includes fixed edge 39 and upwardly inwardly directed free edge 40.

Free edge 40 of panel 35 is spaced from panel 34 to define an opening 42 which extends substantially diametrically across sidewall 22. Panel 34 includes a terminal portion 43 adjacent free edge 38 which extends over opening 42. An opening 44 extends through each panel 34 and 35 proximate the juncture of the respective fixed edge and the interior surface 23 of sidewall 22.

Figure 4:
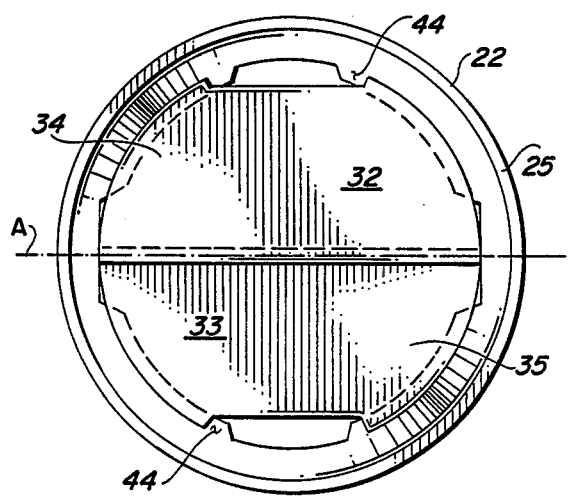
FIG. 4 is a top plan view of the embodiment of FIG. 1.
Figure 5:
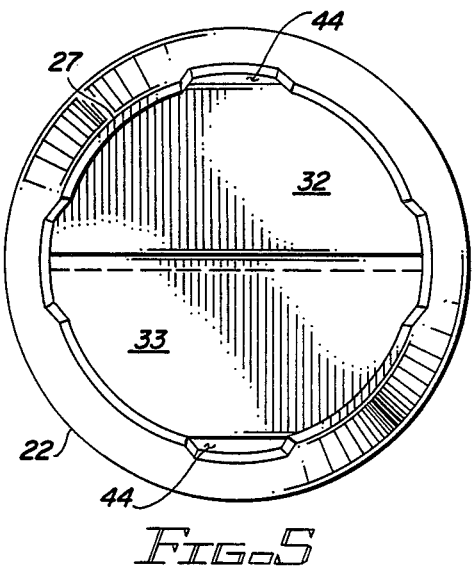
FIG. 5 is a bottom plan view of the embodiment of FIG. 1.

As previously noted, free edge 40 of panel 35 is spaced from panel 34 to provide opening 42. Were opening 42 not present, panels 34 and 35 would meet along an apex as substantially defined by the broken line A in FIG. 4. Accordingly, bottom 30 may be defined as including a first top surface 32 and a second top surface 33 which extend downwardly outward from a substantial apex, represented by the broken line A, in opposite directions to the interior surface 23 of sidewall 22. Further, due to the presence of the several opening 42 and 44, bottom 30 may be further defined as being foraminous. Openings 28 generally reside intermediate lower edge 27 and bottom 30. In accordance with an immediately preferred embodiment of the invention, sidewall 22 is an inverted frusto-conical section. In addition to imparting a rather traditional appearance, the immediately selected shape of sidewall 22 also permits stacking the containers for compact shipment and storage.

Horticultural container 20, colloquially referred to as a flower pot, is especially adapted for holding potting medium in which is supported the root structure of a plant. As will be appreciated by those skilled in the art, drainage and aeration of the potting medium are important considerations. Due to the slope of surfaces 32 and 33, water passing through the potting medium is directed to the openings 44 for positive drainage. Container 20 may be placed upon a conventional secondary vessel for receiving the drainage from openings 44. Air, entering the space between bottom 30 and lower edge 27 of sidewall 22 through openings 28 is available to move upwardly through opening 42 for purposes of aeration. For efficient drainage, openings 44 may be sufficiently narrow that loss of potting material is substantially minimized. Terminal portion 43 functions as a hood over aeration opening 42 to prevent free passage of the potting medium therethrough. A slope in the range of 30° to 45°, as represented by the annual alpha in FIG. 2, for surfaces 32 and 33 is suggested for optimum results.

Figure 6:
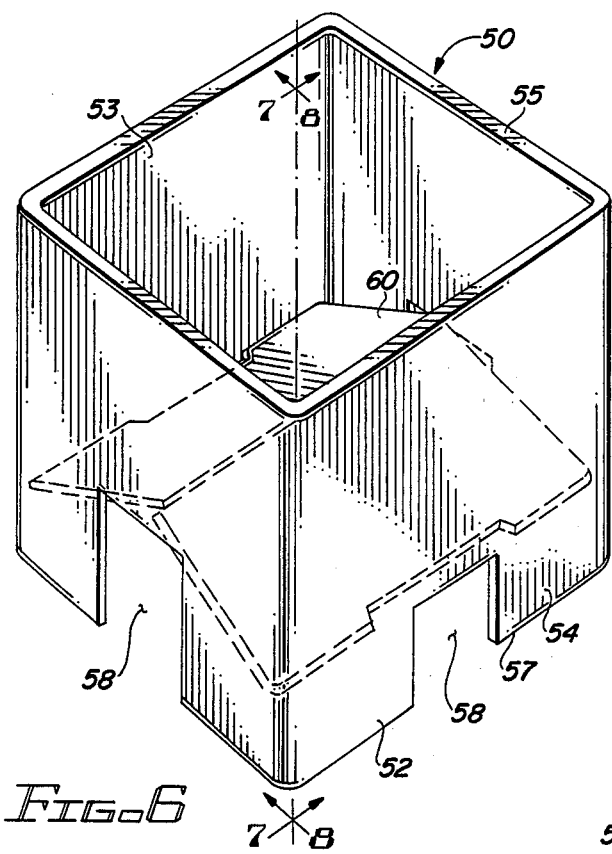
FIG. 6 is an alternate horticultural container embodying the principals of the instant invention.

Referring now to FIG. 6, there is seen an alternate embodiment of the instant invention generally designated by the reference character 50 including upright sidewall 52 having interior surface 53, exterior surface 54, upper edge 55 and lower edge 57. Openings 58 through sidewall 52 are in the form of slots extending upwardly from lower edge 57. Upper edge 55 defines an open top for the container.

Figure 7:
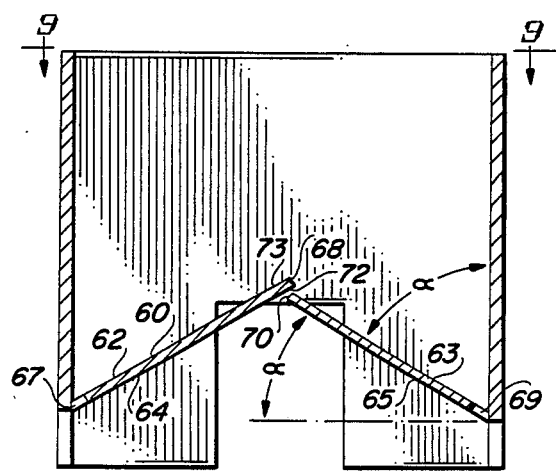
FIG. 7 is a vertical sectional view taken along the line 7—7 of FIG. 6.
Figure 8:
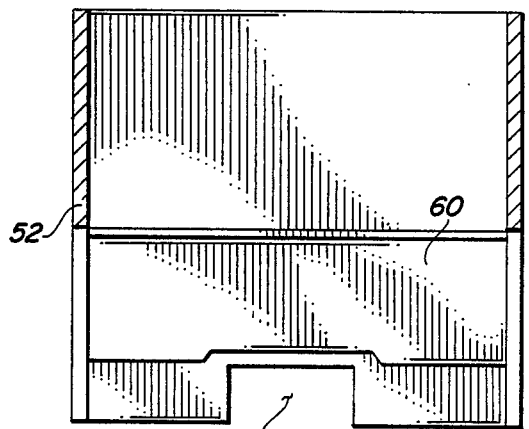
FIG. 8 is a vertical sectional view taken along the line 8—8 of FIG. 6.
Figure 9:
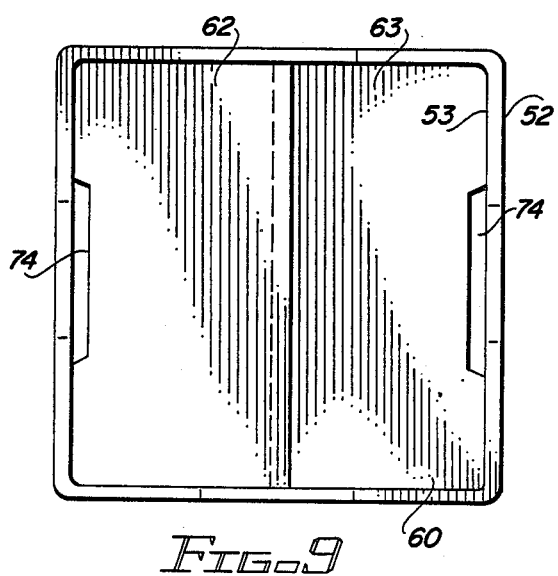
FIG. 9 is a top plan view of the embodiment of FIG. 6.

Container 50 further includes bottom 60 as viewed with additional reference to FIGS. 7 and 8. Bottom 60 includes first top surface 62 and second top surface 63 carried by first panel 64 and second panel 65, respectively. First panel 64 extends between fixed edge 67 adjacent the interior surface 53 of sidewall 52 and upwardly inwardly directed free edge 68. Similarly, panel 65 extends between fixed edge 69 and free edge 70. Free edge 70 of panel 65 is spaced from the panel 64 to define elongate transverse opening 72. Terminal portion 73 of panel 64 adjacent end 68 extends over the openings 72. Drainage openings 74 extending through bottom 60, as viewed in FIG. 9, are preferably in the form of elongate slits proximate the juncture of the respective panel 64 and 65 and the interior surface 53 of sidewall 52.

In all aspects not specifically described otherwise, the immediate embodiment is structurally and functionally analogous to the previously described embodiment. It is noted that the embodiment designated by the reference character 50 is generally rectangular in cross-section and the sidewall is substantially vertical. This is in contrast to the previously described embodiment designated by the reference character 20 in which the sidewall is generally circular in plan and sloping in elevation. The foregoing examples were chosen for purposes of illustrating the fact that the flower pot may assume various shapes and proportions within the scope of the teachings of the instant invention.

Figure 10:
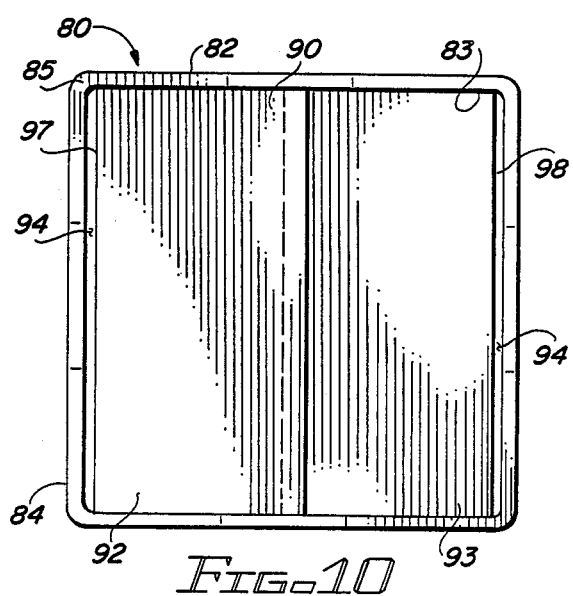
FIG. 10 is a view generally corresponding to the view of FIG. 9 and showing yet another embodiment of the invention.

Yet another exemplary embodiment, generally designated by the reference character 80 is illustrated in FIG. 10. In general similarity to the previously described embodiments, the immediate embodiment includes upright sidewall 82 having interior surface 83, exterior surface 84, and upper edge 85. Further included is bottom 90 having first top surface 92 and second top surface 93. For all other elements not specifically illustrated or described, reference is made to the embodiment generally designated by the reference character 50. The immediate embodiment differs from the previous embodiment by that the fact that drainage openings 94 extend the full length of the panels 92 and 93. Accordingly, the edges 97 and 98 of the panels 92 and 93, respectively, adjacent the openings 94 are considered to be the outboard edges. The lateral edges of the panels are affixed to the surface 83 for securement of the bottom 90 within the sidewall 82.

Various changes and modifications to the embodiments herein chosen for purposes illustration will readily occur to those skilled in the art. For example, while the drainage openings and the aeration openings have been generally shown as elongate slits, such illustration is intended to be representative of openings of any shape, including circular, which may penetrate the bottom at any chosen location. It is also anticipated that the aeration opening may be sheltered or hooded by a separate elongate element traversing the sidewall at a location spaced above the bottom. It will also be appreciated that the immediate horticultural container may be fabricated of any selected material such as plastic, wood, or ceramic. To the extent that such modifications and variations do not depart from the spirit of the invention, they intend to be included within the scope thereof which is assessed only by a fair interpretation of the following claims.

Having fully described and disclosed the instant invention in such clear and concise terms as to enable those skilled in the art to understand and practice the same, the invention claimed is:

1. A container for holding potting medium in which is supported the root structure of a plant and for providing improved drainage and aeration of the potting material, said container comprising:
   a continuous upstanding sidewall including
      an upper edge defining an open top,
      a lower edge, and
      an interior surface; and
   a foraminous bottom including
      a first panel member having a first top surface and an inwardly directed free edge, and
      a second panel member having a second top surface and an inwardly directed free edge
      said panel members extending downwardly outward from a substantial apex in opposite directions to said interior surface, and the free edge of one of said panel members extending over and spaced above the free edge of the other of said panel members, proximate said apex.

2. The container of claim 1, wherein said first and said second panel members are spaced above the lower edge of said sidewall.

3. The container of claim 1, further including an opening through said sidewall below said panel members.

4. The container of claim 3, wherein said opening projects upwardly from said lower edge.

5. The container of claim 1, wherein said bottom includes an undersurface spaced above the lower edge of said sidewall.

6. The container of claim 5, further including an opening through said sidewall intermediate the lower edge and the undersurface of said bottom.

7. The container of claim 1, wherein said bottom includes an aeration opening proximate said apex.

8. The container of claim 7, further including a hood extending over said aeration opening to prevent free passage of said potting medium therethrough.

9. A container for holding potting medium in which is supported the root structure of a plant and for providing improved drainage and aeration of the potting material, said container comprising:
   a continuous upstanding sidewall including
      an upper edge defining an open top,
      a lower edge, and
      an interior surface;
   a bottom including
      a first top surface,
      a second top surface
      said top surfaces extending downwardly outward from a substantial apex in opposite directions to said interior surface, and
      a drainage opening extending therethrough proximate the juncture of each top surface and said internal surface.

10. The container of claim 9, wherein said first and said second panel members are spaced above the lower edge of said sidewall.

11. The container of claim 9, further including an opening through said sidewall below said panel members.

12. The container of claim 11, wherein said opening projects upwardly from said lower edge.

13. The container of claim 9, wherein said bottom includes an undersurface spaced above the lower edge of said sidewall.

14. The container of claim 13, further including an opening through said sidewall intermediate the lower edge and the undersurface of said bottom.

15. The container of claim 9, wherein said bottom includes an aeration opening proximate said apex.

16. The container of claim 15, further including a hood extending over said aeration opening to prevent free passage of said potting medium therethrough.

17. The container of claim 14, further including an opening through said sidewall and communicating with at least one of said drainage openings.

* * * * *